Sept. 15, 1925.                                                    1,553,599
                           G. F. DE WEIN
                    ROTOR END THRUST BALANCING DEVICE
                         Filed Jan. 28, 1920
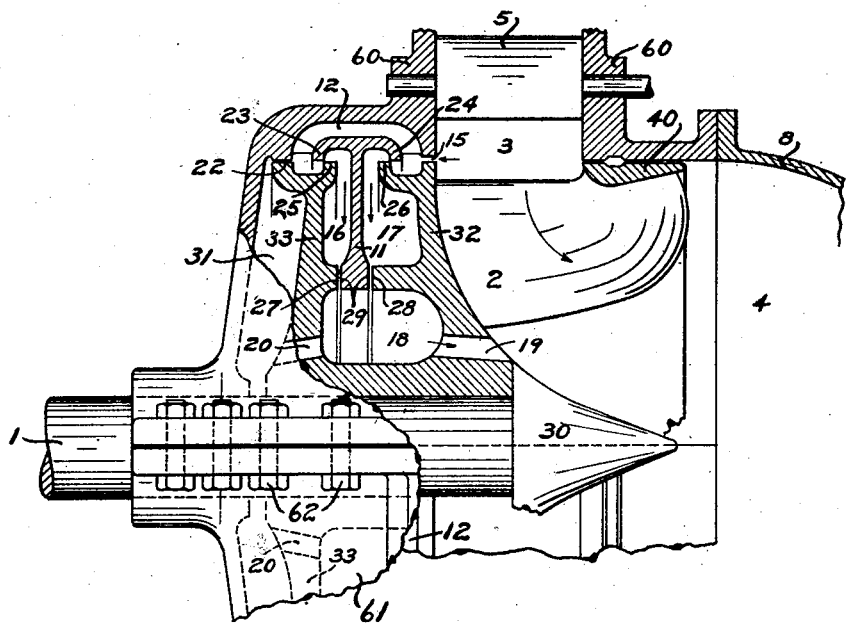
Inventor Patented Sept. 15, 1925.

1,553,599

UNITED STATES PATENT OFFICE.

GEORGE F. DE WEIN, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE.

ROTOR-END-THRUST BALANCING DEVICE.

Application filed January 28, 1920. Serial No. 355,144.

*To all whom it may concern:*

Be it known that GEORGE F. DE WEIN, a citizen of the United States, residing at Milwaukee, in the county of Milwaukee and State of Wisconsin, has invented a certain new and useful Improvement in Rotor-End-Thrust Balancing Devices, of which the following is a specification.

This invention relates in general to improvements in the construction and operation of balancing devices for rotary elements, and relates more specifically to improvements in rotor end thrust balancing devices operable by fluid under pressure.

An object of the invention is to provide a rotor end thrust balancing device which is simple in construction and efficient in operation. Another object is to provide an improved balancing device located at one side of a rotor for counterbalancing end thrust upon the rotor in either direction.

In Patent 1,180,602 is shown a fluid actuated balancing device located at one side of a rotor for counterbalancing end thrust upon the rotor in either direction. The patented structure comprises a pair of opposed pressure chambers located on the same side of the rotor and provided with fluid inlet and discharge passages communicating with common pressure and relief regions, respectively. The fluid inlet passages are formed of constant cross-sectional areas and of substantially constant length while the fluid discharge passages are of variable cross-sectional area and of constant length. One advantage of this structure is that it may be applied to rotors of such form that it would be difficult and in some instances impossible to place a part of the end thrust balancing mechanism on each side of the rotor.

In Patent 1,323,412 is shown an improved fluid pressure actuated balancing device located in part on each side of a rotor, the portion of balancing device on one side of the rotor being adapted to counterbalance end thrust upon the rotor in one direction, and the portion of balancing device on the opposite side of the rotor being adapted to counterbalance end thrust upon the rotor in the opposite direction. The structure disclosed in this patent comprises a pair of opposed pressure chambers located one on each side of the rotor and provided with fluid inlet and discharge passages communicating with common pressure and relief regions, respectively. The fluid inlet passages are formed between cooperating pairs of ring members located at the peripheries of the balancing chambers and supported respectively by the rotary and stationary members, each of these ring members being provided with a flange extending toward the member, other than that by which it is supported. The fluid discharge passages are of variable cross-sectional area and are of substantially constant length as in the case of the preceding patent referred to.

The present invention contemplates the provision of an improved fluid actuated balancing device located at one side of a rotor for counterbalancing end thrust upon the rotor in either direction, generally similar to that disclosed in Patent 1,180,602 but which embodies the improved inlet passage forming structure disclosed in Patent 1,323,-412. The invention furthermore contemplates the provision of means for permitting ready assembly and dismantling of a motor or pump provided with such end thrust balancing structure.

A clear conception of several embodiments of the invention may be had by referring to the drawing accompanying and forming a part of this specification.

The single figure is a fragmentary central vertical section through a hydraulic turbine having horizontally split casing sections and embodying an end thrust balancing device located on one side thereof, a part of the casing being shown in elevation.

While the invention has been illustrated herein as specifically applied to a horizontally disposed Francis hydraulic turbine of the radial inward flow and axial discharge type, it will be obvious that the principles are generally applicable to any other type of rotor in which it is desired to locate the balancing device at one side of the rotor and wherein it is desirable to have the balancing device capable of counterbalancing end thrust in either direction. The invention is especially applicable for the purpose of counterbalancing end thrust upon the rotors of steam, gas or hydraulic turbines, centrifugal pumps and similar devices.

The turbine comprises a rotor 2 mounted upon a main shaft 1 and housed within a suitable casing. The rotor 2 during normal operation of the turbine receives fluid under pressure from a supply passage 3 which is provided with adjustable guide vanes 5. The fluid after passing through the rotor 2 is delivered into a discharge passage 4 which communicates with a draft tube in the usual manner. The rotor 2 is provided with an end wall 13, 32 secured to the main shaft 1 and having a plurality of vanes extending therefrom in a direction longitudinally of the shaft 1. The outer extremities of the rotor vanes are connected by means of an annular shroud 40 having an outer cylindrical surface co-operating with the adjacent casing surface. The end of the shaft 1 adjacent to the rotor 2 is provided with a conical element 30 adapted to properly guide the fluid delivered from the rotor into the passage 4.

Referring specifically to the figure the enclosing casing is split along a horizontal plane, the rotor 2 is formed as an integral structure and is secured to the main shaft 1 in any suitable manner. The rotor end thrust balancing device comprises a rotary wall 33 formed integral with the rotor 2, and extending substantially parallel to the rotary end wall 32 of the rotor 2. Extending inwardly from the stationary outer casing sections 60, 61 and located between the movable walls 33, 32, is a stationary diaphragm or wall 11. This stationary wall co-operating with the adjacent movable walls 33, 32 forms a pair of opposed balancing chambers 16, 17. One or more passages 12 formed in the stationary casing sections 60, 61 are constantly in open communication with the pressure chamber or passage 3 through an annular passage 15 located adjacent to the periphery of the wall 32. Formed upon the stationary casing sections 60, 61 and extending inwardly toward the rotary walls 33, 32 respectively, are annular flanges 23, 24. Formed upon transverse ring elements of the rotary walls 33, 32 respectively and extending outwardly toward the stationary casing sections 60, 61 are annular flanges 25, 26. The inner surfaces of the flanges 23, 24 are of slightly greater diameter than are the outer surfaces of the flanges 25, 26 respectively. The co-operating adjacent surfaces and edges of the flanges 23, 24, 25, 26 form passages of variable conductivity for establishing communication between the pressure supply passage 12 and the balancing chambers 16, 17. The inner side portions of the stationary diaphragm or wall 11 are provided with plane parallel end surfaces 29 extending perpendicularly to the axis of the main shaft 1. The distance between these surfaces 29 is slightly less than the distance between the flanges 25, 26 formed on the walls 33, 32 respectively, so that the wall 11 may be withdrawn through the gap between the flanges. Located directly adjacent to the surfaces 29 and formed upon the rotary walls 33, 32 respectively, are plane surfaces 27, 28 which are parallel to the adjacent surfaces 29. The plane surfaces 27, 28 are spaced from the adjacent surfaces 29 a slight amount, thus forming discharge passages of variable cross-sectional area and of constant length leading from the balancing chambers 16, 17 to the relief chamber 18 formed in the rotor 2. The relief chamber 18 communicates through passages 19 with the discharge passage 4, and through passages 20 with an end chamber 31 located laterally of the wall 33. Escape of high pressure fluid from the passage 12 to the chamber 31 is prevented by an extension 22 formed on the wall 33 and co-operating with adjacent surfaces of the casing sections 60, 61 to form a packing.

The casing of the motor disclosed comprises an upper casing section 60 and a lower casing section 61 which coact along a horizontal plane surface passing through the axis of shaft 1. These casing sections 60, 61 are united by means of bolts 62 and have the casing 8 which forms the passage 4, secured to corresponding ends thereof. The motor disclosed may be readily disassembled by removing the bolts 62 and the end casing 8, after which the upper casing section 60 may be removed from the lower casing section 61. By making the gap between the flanges 25, 26 of greater width than the distance between the surfaces 29 of the wall 11, such lateral removal of the casing section is readily permitted. After one of the casing sections 60, 61 has been removed the rotor 2 may be removed laterally from the other section.

During the normal operation of the turbine, fluid under pressure is delivered past the guide vanes 5 to the chamber 3 and from the chamber 3 to the rotor 2 and into the passages 12 through the opening 15. If with fluid pressure thus established in the passages 12, the rotor 2 is shifted endwise to the left from the position shown in the figure the outwardly extending annular flange 26 will move with the rotor away from the inwardly extending annular flange 24 of the stationary casing thereby increasing the conductivity of the inlet passage leading to the chamber 17. The plane surface 28 simultaneously moves with the rotor toward the adjacent plane surface 29 thereby decreasing the cross-sectional area and hence the conductivity of the discharge passage between these surfaces. Fluid under pressure then enters the balancing chamber 17 from the passages 12 thereby increasing the pressure in this chamber and producing a counterbalancing pressure upon the rotor end wall 13, 32 in a direction away from the stationary diaphragm or wall 11. Simultaneously with this establishment of pressure in the balancing chamber 17, and while the rotor 2 is moving to the left, the outwardly extending annular flange 25 of the rotating wall 33 moves toward the inwardly extending annular flange 23 of the stationary casing thereby diminishing the conductivity of the inlet passage leading from the passages 12 to the chamber 16. The plane surface 27 of the rotary wall 33 simultaneously moves with the rotor 2 away from the adjacent plane surface 29 of the wall 11, thereby increasing the cross-sectional area and hence the conductivity of the discharge passage and permitting fluid to escape from within the balancing chamber 16 to the chamber 18 from which the fluid is free to flow through the passages 19, 20 to regions of low pressure.

If an end thrust upon the rotor 2 in the opposite direction causes the rotor to move to the right from the position illustrated in the drawing, the degree of conductivity between the passages 12 and the chambers 16 is augmented while the degree of conductivity between the passages 12 and the chamber 17 is diminished. The gap between the plane surface 27 and the adjacent surface 29 is decreased in cross-sectional area while the gap between the plane surface 28 and the adjacent surface 29 is increased. Fluid under pressure then enters the balancing chamber 16 producing a counterbalancing pressure against the rotating wall 33, while fluid from the chamber 17 simultaneously escapes and relieves the pressure within the balancing chamber 17. It will thus be noted that the end thrust balancing mechanism which is located entirely at one side of the rotor 2, is capable of counterbalancing end thrust upon the rotor in either direction. The motor disclosed in the drawing may be readily dismantled and assembled in the manner hereinabove described. It will also be obvious that the present structure embodies all of the desirable features of the patents hereinabove referred to thereby producing an efficient rotor and thrust balancing device capable of being located entirely at one side of the rotor.

It should be understood that it is not desired to limit the invention to the exact details of construction and operation herein shown and described, for obvious modifications within the scope of the appended claims may occur to persons skilled in the art.

It is claimed and desired to secure by Letters Patent:

1. In combination, a horizontally split casing, a rotor within said casing, pressure chambers on one side of said rotor said chambers being formed by a portion of said casing extending between portions of said rotor, means of pressure communication to said chambers said means comprising annular flanges coaxial with said rotor and supported by said rotor and casing respectively, the rotor flanges lying radially within said casing flanges, and means of pressure discharge directly from said chambers, the upper section of said casing being laterally removable from said rotor and from the lower casing section and said rotor being laterally removable from said lower casing section upon removal of said upper casing section.

2. In combination, a horizontal split casing, a rotor within said casing, pressure chambers on one side of said rotor, said chambers being formed by a portion of said casing extending between portions of said rotor, means forming gaps for pressure communication to said chambers the cross section of one of said gaps varying inversely to that of another of said gaps upon endwise movement of said rotor, and means of pressure discharge directly from said chambers, the upper section of said casing being laterally removable from said rotor and from the lower casing section and said rotor being laterally removable from said lower casing section upon removal of said upper casing section.

3. In combination, a horizontally split casing comprising upper and lower sections, a rotor within said casing, pressure chambers on one side of said rotor, said chambers being formed by a portion of said casing extending between movable portions of said rotor, means of pressure communication directly from a common supply to said chambers, and means of pressure discharged directly from said chambers to a common relief chamber, said upper casing section being laterally removable from said rotor and from said lower casing section and said rotor being laterally removable from said lower casing section upon removal of said upper casing section.

4. In combination, a horizontally split casing comprising upper and lower sections, a rotor within said casing, pressure chambers on one side of said rotor, said chambers being formed by a portion of said casing extending between portions of said rotor, means forming gaps of pressure communication directly from a common supply so said chambers, the cross-section of one of said gaps varying at a rate different from that of another during endwise movement of said rotor, and means of pressure discharge directly from said chambers to a common relief chamber, said upper casing section being laterally removable from said rotor and from said lower casing section and said rotor being laterally removable from said lower casing section upon removal of said upper casing section.

In testimony whereof, the signature of the inventor is affixed hereto.

GEORGE F. DE WEIN.